C. L. PITTMAN.
SAFETY ATTACHMENT FOR RAILWAY CAR TRUCKS.
APPLICATION FILED SEPT. 6, 1921.
1,418,827.
Patented June 6, 1922.
3 SHEETS—SHEET 3.
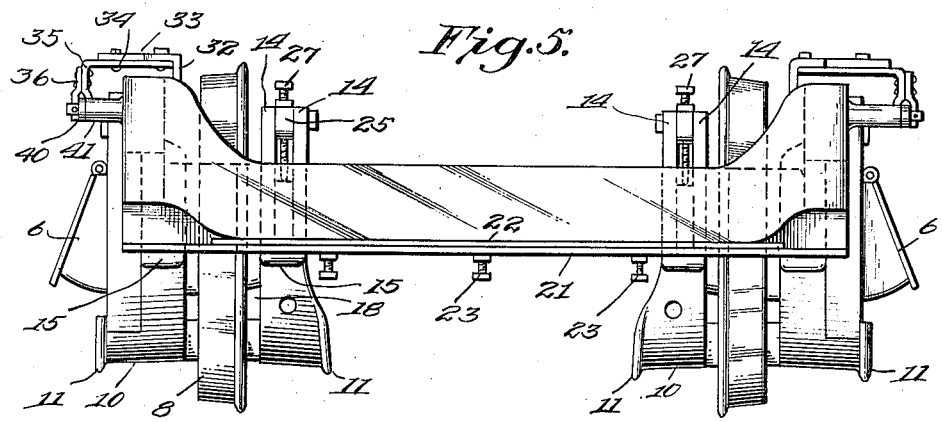
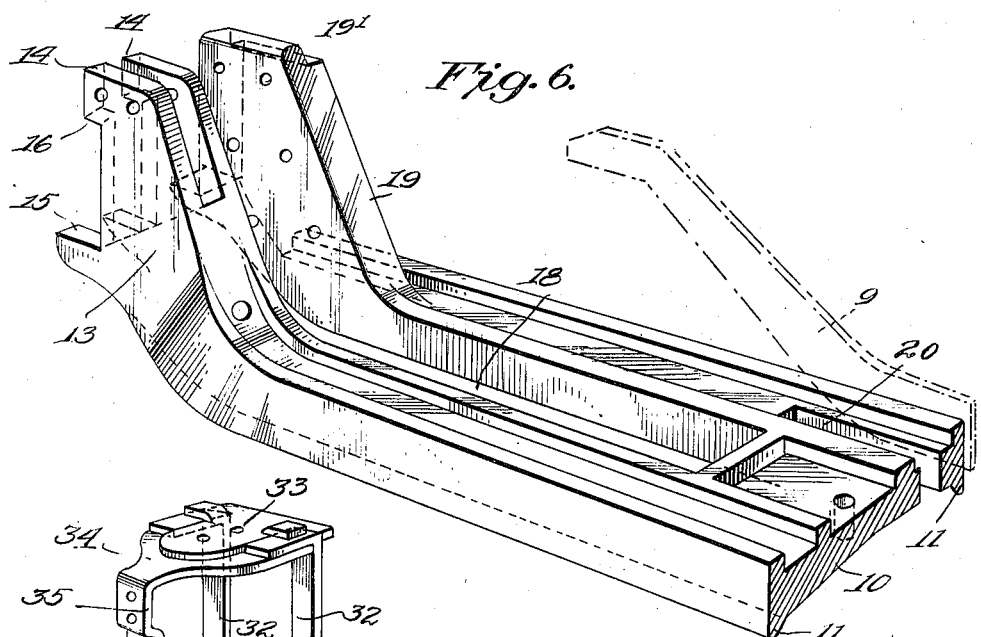
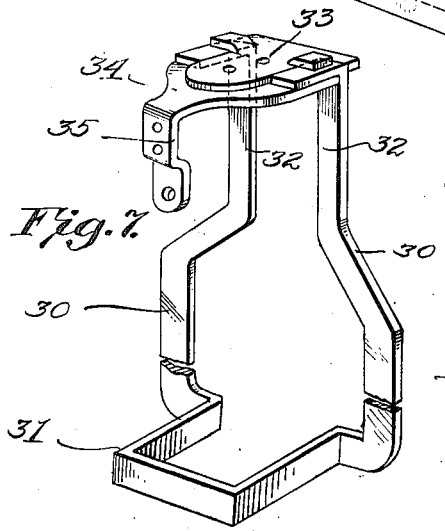
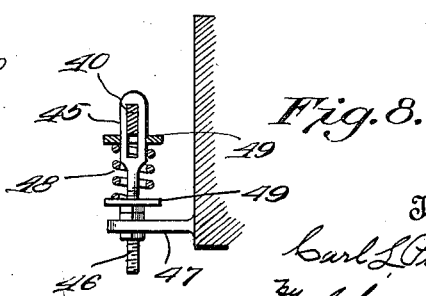

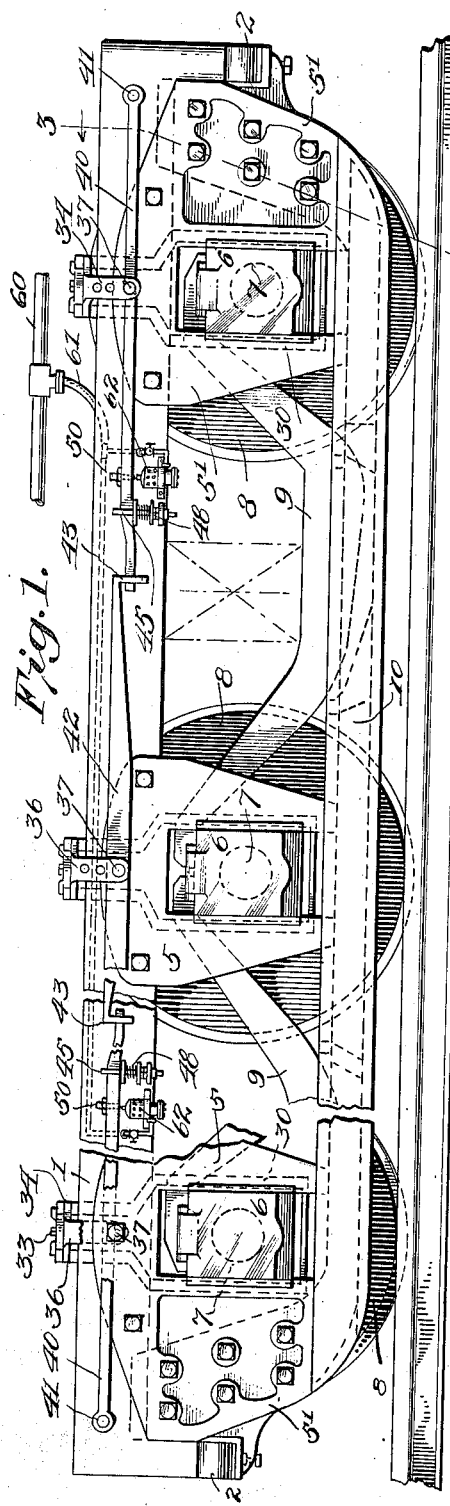

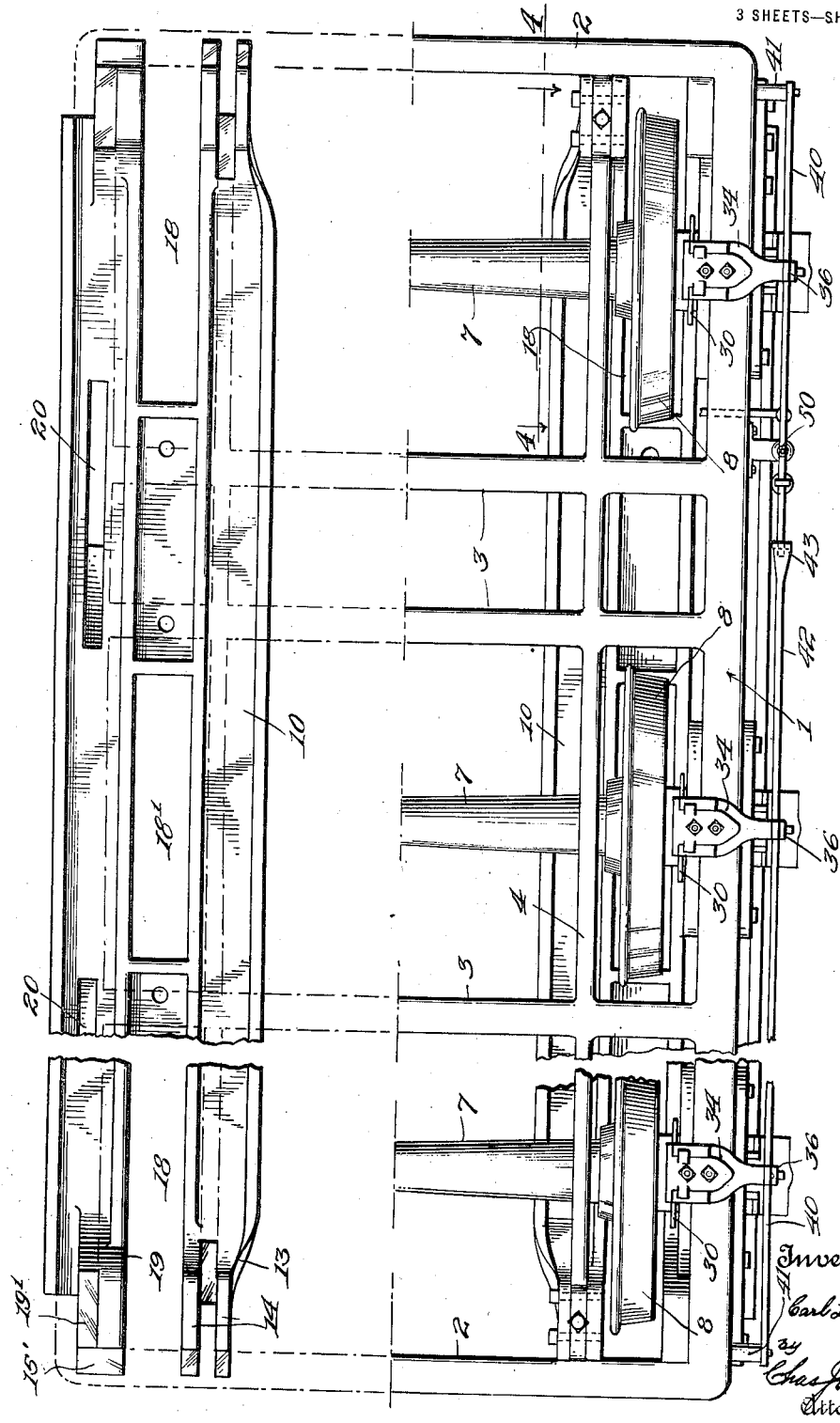

UNITED STATES PATENT OFFICE.

CARL L. PITTMAN, OF DE LEON, TEXAS.

SAFETY ATTACHMENT FOR RAILWAY-CAR TRUCKS.

1,418,827.  Specification of Letters Patent.  Patented June 6, 1922.

Application filed September 6, 1921. Serial No. 498,792.

*To all whom it may concern:*

Be it known that I, CARL L. PITTMAN, a citizen of the United States, residing at De Leon, in the county of Comanche and State of Texas, have invented certain new and useful Improvements in Safety Attachments for Railway-Car Trucks; and I do hereby declare the following to be a full, clear, and exact description of the invention, such as will enable others skilled in the art to which it appertains to make and use the same.

The invention relates to safety attachments for railway car trucks of the same general character as that covered by my prior Patent, No. 1,393,313, dated October 11th, 1921, and has for its object to provide a form of skid or shoe, to be attached to trucks of the pedestal type, so as to overlie the rail, straddle the lower portions of the wheels, and having intermediate solid portions adapted to engage the rail when one or more of the wheels leave the track and thereby support the truck. A shoe of the character indicated is located on each side of the truck and is provided with upturned ends adapted to be attached to the pedestals and to the truck frame so as to provide a rigid and durable support for the truck in the event of any or all of the wheels leaving the rails. The invention also comprises a special form of lever mechanism adapted to apply the air brakes when the truck or any of the wheels thereof is derailed, or a wheel or an axle is broken, the lever mechanism being associated with special yokelike attachments which surround each of the several journal boxes, so that any abnormal downward movement of a journal box will depress the corresponding yoke and actuate the particular element of the lever mechanism associated therewith to operate an air valve to set the brakes. The invention also contemplates various elements of adjustment between the skids or shoes and the truck, to adapt the shoes for application to various trucks of the pedestal type, as will be more particularly pointed out hereinafter.

In the accompanying drawings Fig. 1 is a side elevation of a standard pedestal truck having the invention applied thereto.

Fig. 2 is a plan view thereof, one half of the truck frame being indicated in dotted lines only.

Fig. 3 is a sectional elevation on line 3—3 of Fig. 1.

Fig. 4 is a section on line 4—4 of Fig. 2 looking in the direction of arrows.

Fig. 5 is an end elevation of the truck.

Fig. 6 is a perspective view of one end of a shoe or skid.

Fig. 7 is a perspective view of the yoke device adapted to surround an axle box and to be connected with the air valve lever mechanism.

Fig. 8 is a detail showing the spring support for certain elements of the lever mechanism.

Referring to the drawings, 1 indicates side members or longitudinals of a truck frame, having connecting end beams 2, intermediate cross beams 3 and additional longitudinal beams 4. As illustrated this truck frame is formed as an integral casting, but obviously may be made up of separate parts suitably connected in accordance with the standard practice. Depending from the said beams 1 and rigidly secured thereto are pedestals 5, in which are mounted the usual journal boxes 6, supporting the axles 7 of the wheels 8. The particular exemplification of the invention involves a standard 6-wheel pedestal truck so that the usual equalizer bars 9 are supported from the tops of the journal boxes, and in turn support the truck bolsters. Each of the end pedestals is provided with a lateral extension 5' projecting toward the end beams 2, and which serves as one of the supports or attachments for a corresponding skid or shoe.

Each skid or shoe is preferably formed as an integral casting 10 having reinforcing flanges about its upper edges. The ends of the shoe are bifurcated to provide openings or recesses 18 to straddle the wheels and the middle portion of the shoe is recessed as at 18' to permit the intermediate wheel to pass therethrough. The portion of the shoe between the wheels is solid and overlies the subjacent rail, so that the bottom of the shoe presents a broad substantially flat surface overlying the rail and having on each of its lateral edges a guard flange 11. Each end of the shoe is provided with upward extensions 13 and 19, the former of which is forked or divided into jaws 14—14 which are adapted to straddle the longitudinal beam 4 of the truck frame, near its junction with the end beam 2 and the vertical face of the end section 13 is provided with jaws 15 and 16. Each end section 19 of the shoe is provided with a lower jaw 15' and a vertical recess 19' on its outer face.

Each of the end sections 19 is attached to the inner face of the adjacent pedestal 5, by means of bolts passed through registering holes in the end 19 and the extension 5' of said pedestal, and each end section 13 is adjustably secured to the longitudinal beam 4, at the forked end 14 of said section, which straddles said beam 4, and is provided with a filler block 25 bolted between the jaws 14 and carrying a set screw 27 which bears upon the top of the beam 4.

Underlying each of the end beams 2 is a section of angle iron 21 between which and the underface of the cross beam 2 may be interposed one or more shim plates 22, said angle iron 21 being provided with set screws passing through its vertical and horizontal faces to accurately adjust the said angle iron to proper position with respect to the cross beam 2 and the engaging members of the shoe. The jaws 15 and 16 on each end section 13 of the shoe engage the under face and the upper edge of angle iron 21 respectively and the jaw 15' also engages the under face of the angle iron 21, while the recess 19' engages the under face of the side beam 1 so that, in the event of the truck being derailed, the heavy stresses due to the weight of the truck and the car will be transmitted directly from the shoe or shoes to the truck frame, and will not be imposed upon the bolts which connect the shoe to the pedestals.

In order to accommodate the normal movement of the equalizer bars 9, each of the shoes is provided with longitudinal recesses 20 in which the lower sections of the equalizer bars move freely.

From the foregoing description it will be apparent that the shoes or skids as applied to the truck will support the truck on the rails, in the event that the truck is derailed or any of the wheels breaks, without imposing any undue stress on the connections, for the reason that the weight, as hereinbefore described, is transferred directly from the shoe or shoes to the elements of the truck frame.

It is highly desirable that, in the event of derailment of the truck or the breakage of a wheel or an axle, the truck be not only supported on the rails by the skids but also that the car or train be quickly brought to a stop, to prevent further damage to the truck or to the roadway. To effect this object, the invention comprises means for operating a suitable valve or valves connected with the air brake line, which will be operated when any of the indicated accidents occur. The mechanism for effecting this object includes yokes surrounding each of the journal boxes, and so connected with lever mechanism, adapted to operate the air valve or valves, that when any journal box moves downward to an abnormal extent in its supporting pedestal, it will engage the corresponding yoke and move the lever element connected therewith to operate the air valve. One of the yokes is illustrated in detail in Fig. 7 and comprises a metal frame consisting of side members 30 having a lateral extension 31 underlying the axle box and arms 32 secured to a top plate 33, which in turn supports a horizontal plate 34 having a pendant bracket arm 35 carrying a removable clip or jaw 36. Each of the yokes associated with an end journal box is suspended from bracket 35 by a pivot 37, engaging a lever 40 intermediate its ends, said lever being connected at one end by a pivot 41 to a side beam 1. The intermediate yokes are each suspended from a lever 42 having angularly disposed eyes 43 at its opposite ends, which are engaged by the free ends of co-operating levers 40, so that all of the three levers on each side of the truck are properly coordinated and are individually actuated by the depression of the corresponding yoke, when the truck is derailed, or a wheel or an axle breaks. The outer end of each of the levers 40 is yieldably supported by a cushioning spring 48 surrounding a rod 46 mounted in a bracket 47 on beam 1, said rod having an eye 45 through which the lever passes.

Mounted on the truck frame below each of the levers 40 is an air valve 62, the stem of which is adapted to be engaged by an adjustable set screw 50 carried by the forward end of said lever 40.

Valves 62 are mounted in a branch 61 from the air brake line 60, so that when any one of said air valves 62 is actuated by the depression of the corresponding lever 40, which may be effected by the depression of the yoke carried thereby, or by the yoke carried by the intermediate lever 42, the brakes are applied and the train brought to a stop.

It will be noted that the shoes or skids may be applied to any standard pedestal truck of either the 4-wheel or the 6-wheel type, without changing the truck construction, except in respect of four of the pedestals which must be provided with lateral extensions 5' to afford proper anchorages or attachments for the end sections 13 of the shoes or skids as described. It will also be apparent that the shoe may be readily adjusted to trucks of the same type in which slight variations occur, through the agency of the auxiliary angle beams 21 and the adjusting screws 27 so that the skids will be supported in proper relation to the other elements of the truck and will always overlie the rails so as to properly support the truck should the latter be derailed or any of the wheels be broken. The two skids or shoes when thus applied to the truck will also serve to materially strengthen and increase the rigidity of the truck and will constitute an effective support for the brake beams, the truck bolsters or any of the other transverse elements which may be accidentally deranged to such an extent that they would otherwise drop upon the track. Furthermore should any of the parts of a shoe become broken or deranged the entire shoe may be quickly removed and replaced by another one without disturbing the general truck structure.

What I claim is:—

1. The combination of a pedestal type railway car truck, safety shoes on each side of the truck having bifurcated ends to straddle the wheels, and means for securing each bifurcated shoe end to the truck frame and to the adjacent pedestal.

2. The combination of a railway car truck having a rigid frame and pedestals thereon the end pedestals having lateral extensions toward the truck ends, safety shoes on each side of the truck having bifurcated ends to straddle the wheels, and means for securing each bifurcated shoe end to the truck frame and to the lateral extension of the adjacent pedestal.

3. The combination of a railway car truck having a rigid frame and pedestals thereon, safety shoes on each side of the truck each shoe including a solid middle section and bifurcated end sections the latter straddling the adjacent wheels and having upturned ends, and means for securing each bifurcated shoe end to the truck frame and to the adjacent pedestal.

4. The combination of a railway car truck having a rigid frame and pedestals thereon the end pedestals having lateral extensions toward the truck ends, safety shoes on each side of the truck having bifurcated ends to straddle the wheels and an intermediate solid section overlying the corresponding rail, means for securing each bifurcated shoe end to the truck frame and to the adjacent pedestal, and L-shaped beams underlying the end beams of the truck frame, said shoe ends having jaws for engaging said L beams.

5. The combination of a pedestal type railway car truck, safety shoes on each side of the truck having bifurcated ends to straddle the wheels, means for securing each bifurcated shoe end to the truck frame and to the adjacent pedestal, and means for applying the air brakes when the truck or a wheel thereof leaves the track and the shoe engages the track.

6. The combination of a railway car truck, safety shoes on each side of the truck having bifurcated ends to straddle the wheels and solid intermediate portions overlying the adjacent rails, means for securing the bifurcated shoe ends to the truck frame, yokes surrounding the journal boxes, levers carried by the truck frame, connections for suspending the respective yokes from the adjacent levers, brake valve mechanism carried by the truck, and connections between said brake valve mechanism and the said levers, to set the brakes when a journal box drops to engage the surrounding yoke.

In testimony whereof I affix my signature.

CARL L. PITTMAN.